United States Patent [19]
Kalinoski

[11] Patent Number: 6,164,140
[45] Date of Patent: Dec. 26, 2000

[54] SOLID STATE TRANSDUCER FOR CORIOLIS FLOWMETER

[76] Inventor: Richard W. Kalinoski, 64 Francis La., Little Compton, R.I. 02837

[21] Appl. No.: 09/169,092

[22] Filed: Oct. 9, 1998

[51] Int. Cl.⁷ .................................................. G01F 1/84
[52] U.S. Cl. .............................. 73/861.357; 73/861.355; 324/207.13
[58] Field of Search ................. 73/861.356, 861.357, 73/861.355; 324/207.13

[56] References Cited

U.S. PATENT DOCUMENTS

| | | | |
|---|---|---|---|
| 4,187,721 | 2/1980 | Smith | 73/861.356 |
| 4,769,882 | 9/1988 | Rosen et al. | 29/25.35 |
| 4,777,833 | 10/1988 | Carpenter | 73/861.355 |
| 5,131,280 | 7/1992 | Lew | 73/861.355 |
| 5,321,991 | 6/1994 | Kalotay | 73/861.357 |
| 5,488,870 | 2/1996 | Yoshimura et al. | 73/861.356 |
| 5,501,106 | 3/1996 | Lew et al. | 73/861.356 |
| 5,531,126 | 7/1996 | Drahm | 73/861.357 |
| 5,700,957 | 12/1997 | Alesz et al. | 73/861.357 |
| 5,708,320 | 1/1998 | Ohnishi et al. | 310/321 |

*Primary Examiner*—Harshad Patel
*Attorney, Agent, or Firm*—David Barron; Richard Sampson

[57] ABSTRACT

A solid state transducer is provided for a Coriolis flow meter having a flow tube adapted to vibrate at a predetermined resonance frequency to determine mass flow rate of a fluid passing therethrough. The driver includes a strain element, such as an elongated piezoelectric or magnetostrictive element fastened axially along the wall of the tube. The strain element is adapted to oscillate in the axial direction along with the tube wall to generate and/or sense vibration of the tube in response to. The transducer may be utilized as a driver or alternatively, as a sensor wherein the transducer is oscillated along with oscillation of tube wall in the axial direction to generate an output signal responsive thereto.

29 Claims, 9 Drawing Sheets

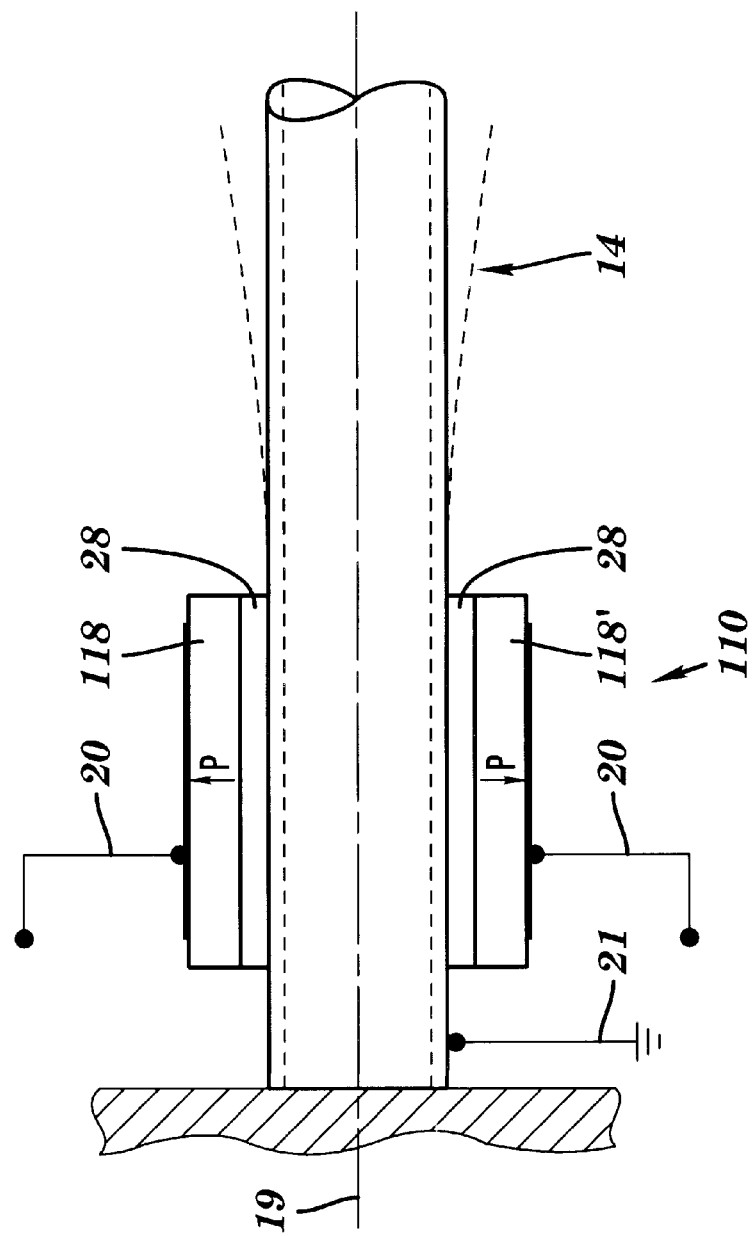

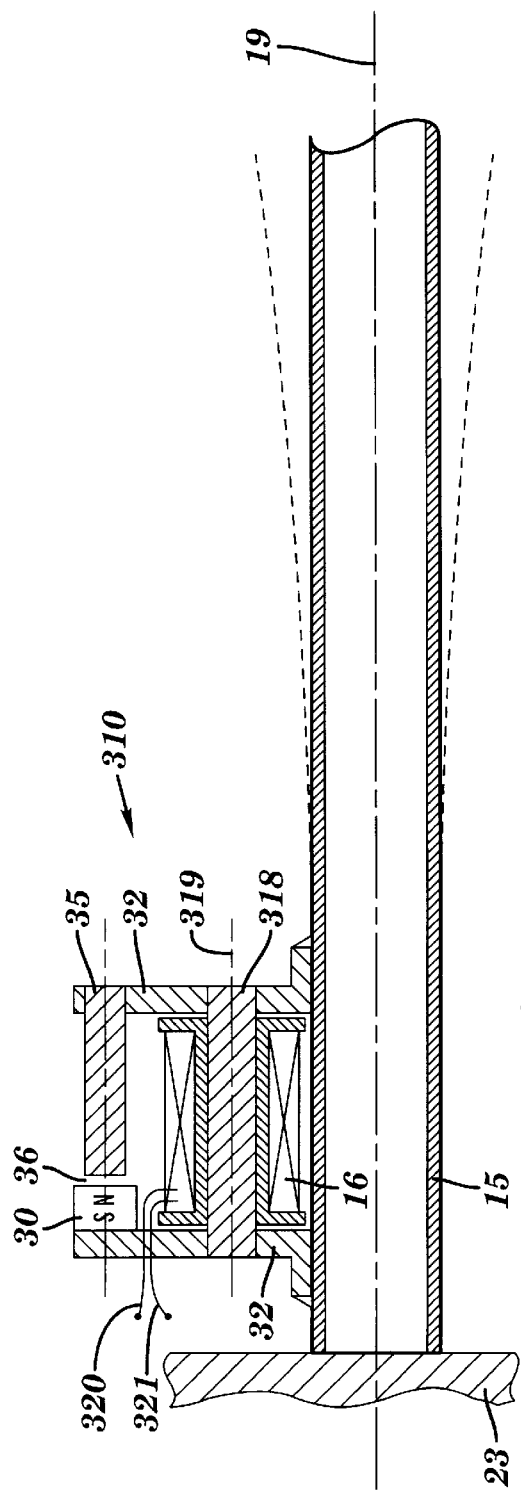
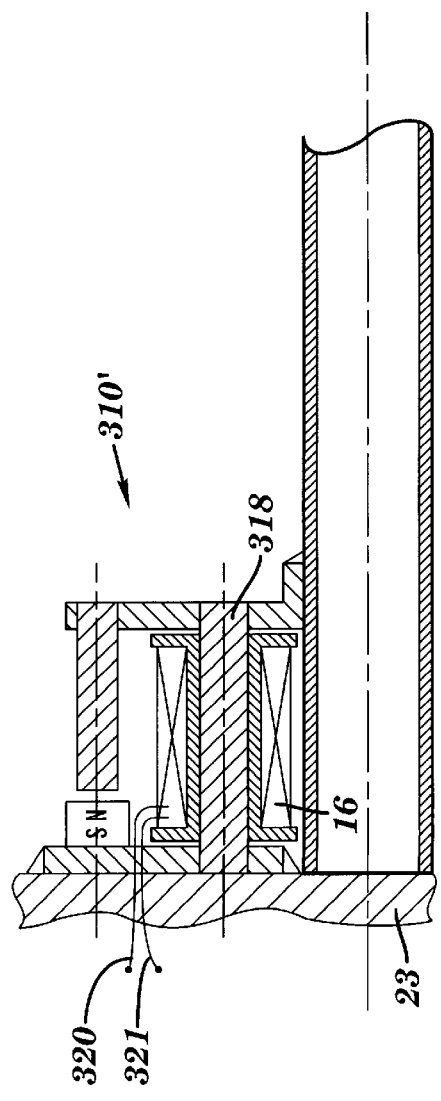
FIG. 15
FIG. 16

SOLID STATE TRANSDUCER FOR CORIOLIS FLOWMETER

BACKGROUND OF THE INVENTION

1. Field of the Invention

This invention relates to Coriolis effect mass flowmeters for measuring fluid flow in a tube or pipe. More particularly, the invention relates to a solid state transducer capable of driving or sensing vibration of the tube or pipe at a resonance frequency.

2. Background Information

Coriolis-type flowmeters have long been utilized to conveniently measure flow of a fluid through a tube or pipe. Although many types of devices may be utilized to perform this function, Coriolis-type devices offer the advantage of providing an output directly proportional to mass flow. This aspect typically enables such devices to provide accurate flow information with reduced need to consider variables such as fluid pressure, temperature and density, etc. Moreover, advantageously, there are no obstacles in the path of the flowing fluid.

The theory underlying a Coriolis-type mass flowmeter and the advantages gained thereby are discussed in an article by K.O. Plache, "Coriolis/gyroscopic Flow Meter" in the March 1979 issue of Mechanical Engineering, pages 36 to 39.

A Coriolis force is generally associated with a continuously rotating system. For example, winds moving uniformly away from the North Pole along a line that appears straight to an observer in space, would appear to an Earth-bound observer to curve Westward. This is commonly referred to as the Coriolis effect. Moreover, a person moving on a turntable or merry-go-round at what appears to be a constant linear speed radially outward on the surface thereof, actually speeds up in the tangential direction. The change in tangential velocity indicates that the person has been accelerated. This Coriolis acceleration of the person generates a force known as a Coriolis force in the plane of rotation perpendicular to the radial movement of the mass. The person will experience this Coriolis force as a lateral force applied from the opposite direction as the acceleration and must lean sideways to compensate for it in order to continue to move forward along the merry-go-round's radius. In vector terminology, the Coriolis force vector is proportional and opposite to the cross-product of the angular velocity vector (parallel to the rotational axis) and the velocity vector of the mass in the direction of its travel with respect to the axis of rotation (e.g. in the radial direction).

It is this Coriolis force or effect that has been applied to mass flow measurement. If a pipe is rotated about a pivot axis orthogonal to the pipe, each discrete portion of material flowing through the pipe is a radially traveling mass which experiences acceleration. The Coriolis reaction force shows up as a deflection or offset of the pipe in the direction of the Coriolis force vector in the plane of rotation.

Coriolis mass flowmeters fall into two categories: continuously rotating and oscillating. The principal functional difference between these two types is that the oscillating version, unlike the continuously rotating one, has periodically (usually sinusoidally) varying angular velocity which produces a continuously varying level of Coriolis force.

Many Coriolis flow meters are dependent on phase shift measurements of the oscillation or twisting of the flow tubes during fluid flow. In a phase shift type device, a driver is typically mounted to a medial portion of the flow tube between the inlet and outlet thereof. When there is no flow through the flowmeter, all points along the flow tube oscillate with identical phase. As fluid begins to flow, Coriolis accelerations of the fluid cause areas along the flow tube to have a different phases. The phase on the inlet side of the flow tube lags the driver, while the phase on the outlet side leads the driver. Sensors can be placed on the flow tube to produce sinusoidal signals representative of the motion of the flow tube. The phase difference between two sensor signals is proportional to the mass flow rate of fluid through the flow tube.

Advantageously, an oscillatory system may employ the bending resiliency of the pipe itself as a hinge or pivot point for oscillation and thus obviate separate rotary or flexible joints. A major difficulty in these systems however, is that the effect of the Coriolis force is relatively small compared not only to the drive force but also to extraneous vibrations. These flowmeters thus tend to rely on being adequately mechanically grounded at the flexure point of the oscillating conduit, the driver and sensors. Unfortunately, however, provision of such a ground tends to be difficult, complicated and concomitantly, relatively expensive. The use of double tubes that vibrate at equal frequencies and opposite phase tend to increase accuracy by reducing errors from outside vibrations. However, use of such double tubes tends to disadvantageously add complexity and cost relative to single tube devices. Moreover, any dependence on exterior support structures for mechanical grounding can itself introduce vibration, such as may be transmitted to the tubes from nearby machinery or other structures.

In an attempt to address this grounding difficulty, devices have been provided that do not require mechanical grounding. One type of device measures torsional oscillations of a flow tube to calculate mass flow and is disclosed in U.S. Pat. No. 4,756,197, entitled CORIOLIS-TYPE MASS FLOWMETER, issued to Herzl, ("Herzl") which is fully incorporated herein by reference. In this device, the flow tube is a loop supported on a stationary frame, with the driver mounted at the vertex of the loop. When fluid is not flowing, the loop vibrates between parallel planes on either side of its static plane. When fluid passes through the loop, it is subjected to Coriolis forces, causing the vibrating loop to torsionally oscillate in accordance with the mass flow rate of the fluid. The torsional oscillations are sensed by a pair of strain gauge transducers mounted in balanced relation on opposite legs of the loop, whereby the signals yielded by the transducers have a difference in magnitude therebetween that depends on the amplitude of the torsional oscillations.

Another type of device that appears to utilize an ungrounded driver is disclosed in U.S. Pat. No. 5,321,991, entitled CORIOLIS EFFECT MASS FLOWMETER, issued to Kalotay, ("Kalotay") which is also fully incorporated herein by reference. This device utilizes a straight flow tube with an ungrounded magnetostrictive driver mounted at or near an anti-node of the second harmonic mode of the natural frequency of the tube section. One aspect of this device relies on determining phase shift using two sensors in the manner described hereinabove. Alternatively, this device may utilize a single sensor mounted to the pipe section at the node point of the second harmonic mode of the natural frequency of the pipe section during zero flow. This sensor is adapted to measure the amplitude of displacement of the zero flow node point due to the Coriolis effect forces from the mass of the material flowing through the oscillating pipe. This measurement is indicative of the mass flow rate of the material flowing through the pipe.

Both Herzl and Kalotay, however, utilize drivers and sensors that have limitations. The Herzl driver is a magnetic device configuration that may be difficult to control in an accurate and repeatable manner. Herzl's sensors are strain gauges that cannot be utilized as drivers. Kalotay's magnetostrictive driver may be easier to control accurately than the Herzl driver, but tends to be relatively complex, expensive, and is generally limited in the amount of vibrational force and amplitude it can apply to a flow tube. Moreover, this driver appears to rely on the inertia of a relatively large, stationary mass. This characteristic itself tends to make Kalotay's driver cumbersome and undesirable for many applications where compact size and light weight are preferred.

A need thus exists for a transducer for a Coriolis flowmeter that may function as a driver and/or a sensor, is relatively easily controlled, can generate relatively high levels of force and amplitude in a repeatable manner and is comparatively inexpensive to manufacture.

SUMMARY OF THE INVENTION

According to an embodiment of this invention, a transducer is provided for a Coriolis flowmeter having a flow tube adapted for vibration at a resonance frequency to determine mass flow rate of a fluid passing through the tube, the resonance frequency having an amplitude direction orthogonal to a longitudinal axis of the flow tube. The transducer includes a strain element disposed in operative engagement with the flow tube, the strain element adapted to selectively generate and sense the vibration of the flow tube by periodic expansion and contraction in the axial direction.

The present invention provides, in a second aspect, a transducer for a Coriolis flowmeter having a flow tube adapted to vibrate at a predetermined resonance frequency to determine mass flow rate of a fluid passing therethrough. The transducer includes a piezoelectric element bonded to at least one portion of a wall of the flow tube. The piezoelectric element is adapted to selectively generate and sense strain in the wall portion in a direction parallel to a longitudinal axis of the flow tube, wherein the strain corresponds to the tube vibration.

In a third aspect of the subject invention, a transducer is provided for a Coriolis flowmeter having a flow tube adapted to vibrate at a predetermined resonance frequency to determine mass flow rate of a fluid passing therethrough. The transducer includes a magnetostrictive element disposed on at least one portion of a wall of the flow tube, the magnetostrictive element adapted to selectively generate and sense strain in the at least one wall portion in a direction parallel to a longitudinal axis of the flow tube, wherein the strain corresponds to the tube vibration.

In a fourth aspect of the subject invention, a Coriolis flowmeter is provided which has a flow tube adapted for vibration at a resonance frequency to determine mass flow rate of a fluid passing through the tube, the resonance frequency having an amplitude direction orthogonal to a longitudinal axis of the flow tube. The Coriolis flowmeter includes a flow tube, and a driver having a strain element disposed in operative engagement with the flow tube. The strain element is adapted to selectively generate and sense vibration of the flow tube by periodic expansion and contraction in the axial direction. The driver is disposed on the flow tube and adapted to vibrate the flow tube at a predetermined resonance frequency. At least one sensor is disposed on the flow tube, the sensor being adapted to generate an output signal corresponding to vibration of the flow tube thereat. Computational means are adapted to receive the output signal and determine the mass flow rate.

In another aspect of the invention, a method is provided for vibrating a flow tube of a Coriolis flowmeter at a predetermined resonance frequency to determine the mass flow rate of a fluid passing therethrough, the resonance frequency having an amplitude direction orthogonal to a longitudinal axis of the flow tube. The method includes the steps of:

(a) providing a transducer having an elongated strain element;

(b) rigidly disposing the strain element on the flow tube;

(c) applying an alternating current to the strain element, wherein the strain element is oscillated.

In a still further aspect of the invention, a method is provided for determining mass flow rate of a fluid passing through a flow tube, method including the steps of:

(a) providing a transducer having an elongated strain element;

(b) rigidly disposing the strain element on the flow tube;

(c) applying an alternating current to the strain element, wherein the strain element is oscillated to vibrate the flow tube at a resonance frequency;

(d) disposing at least one sensor on the flow tube, the at least one sensor being adapted to generate an output signal corresponding to vibration of the flow tube thereat; and (e) applying the output signal to a computational means to determine the mass flow rate.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 5 is a elevational side view of a portion of a Coriolis flowmeter utilizing the transducer of FIGS. 3 & 4 with portions shown in phantom to indicate movement;

FIG. 6 is a front elevational view of the Coriolis flowmeter of FIG. 5;

FIG. 15 is a cross-sectional view similar to that of FIGS. 5 and 11 including one embodiment of the transducer shown in FIGS. 13 & 14;

FIG. 16 is a cross-sectional view similar to that of FIG. 14 of an alternate embodiment of the transducer of FIGS. 13–15.

DETAILED DESCRIPTION OF THE PREFERRED EMBODIMENTS

Figure 1:
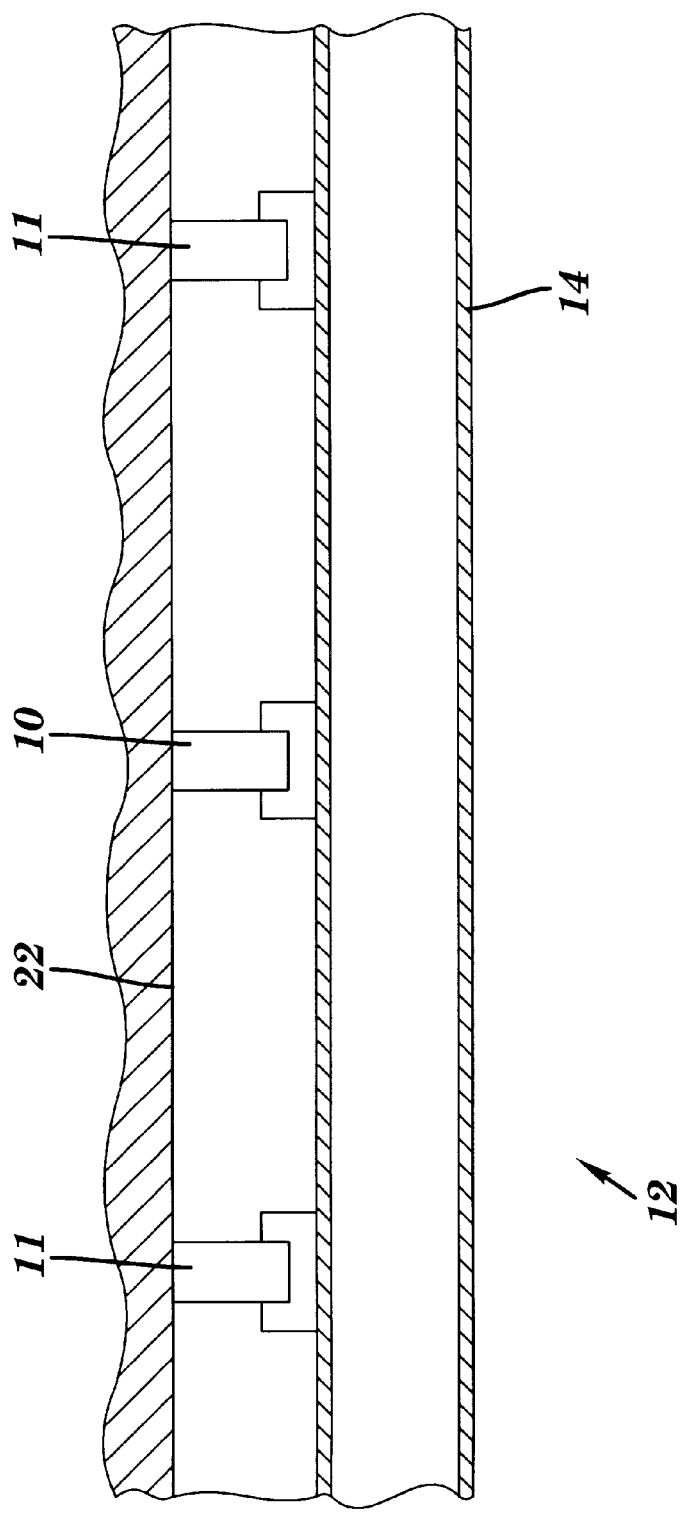
FIG. 1 is a schematic elevational, cross-sectional view of a straight tube Coriolis flowmeter of the prior art.

Referring to the figures set forth in the accompanying Drawings, illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Briefly described, the present invention includes a transducer 110 (FIG. 5) adapted to vibrate a flow tube 14 of a Coriolis flowmeter 112 (FIG. 7) at a predetermined resonance frequency with or without being mounted to a stationary support. Coriolis flowmeter 112 may then be utilized to determine mass flow rate therethrough in a conventional manner. Transducer 110 includes a solid state strain element such as a piezoelectric element 118 or a magnetostrictive element 218 fastened directly to a wall portion of a Coriolis flow tube 14 as shown for example in FIGS. 5, 14 & 15. The strain elements each have a longitudinal axis which extends parallel to a central axis 19 of the flow tube 14 (FIG. 5). The elements 118 and 218 are each adapted to expand and contract along their longitudinal axes in response to an electric or magnetic field. Since this expansion and contraction occurs at a distance from the neutral axis of bending of the tube, the tube experiences alternating bending moments and the tube is caused to vibrate orthogonal to the axis of the flowtube 14. Similarly strain elements 118 and 218 are adapted for being alternately expanded and contracted by movement of the flow tube 14 to generate changes in the electric or magnetic fields thereat, to thereby function as a vibration sensors. Transducers 110, 210 and 310 of the present invention thus serve to sense and generate vibration of the flow tube in a direction substantially orthogonal to the amplitude direction of tube vibration. As used herein, the "amplitude direction" is the direction of tube vibratory movement, namely, the direction normal to axis 19. Advantageously, the present invention provides a relatively high force, low compliance transducer suitable for mounting proximate to, or at, a mechanical ground or node of flow tube 14. The transducer has a relatively low mass for reduced effect on the resonant frequency of the flow tube and enabling use of relatively short electrical leads for improved use on relatively small Coriolis flowmeters.

Where used in this disclosure, the terms "coaxial" or "coaxis" shall refer to a direction substantially parallel to the central axis of a circular body, such as axis 19 of tube 14. Similarly, the term "transverse" shall refer to a direction substantially orthogonal to the coaxial direction. The term "transverse cross-section" shall refer to a cross-section taken along a plane oriented substantially orthogonal to the axial direction of a circular body.

Referring now to the drawings in detail, as shown in FIG. 1, Coriolis flowmeters of the prior art typically include a driver 10 and a pair of sensors 11 disposed on opposite sides thereof at spaced locations along the length of a flow tube 14. As also shown, each of the driver 10 and sensors 11 is mounted on a stationary support or mechanically grounded housing 22 to facilitate precise excitation of the tube and mass flow measurement in a conventional manner as described hereinabove.

Figure 2:
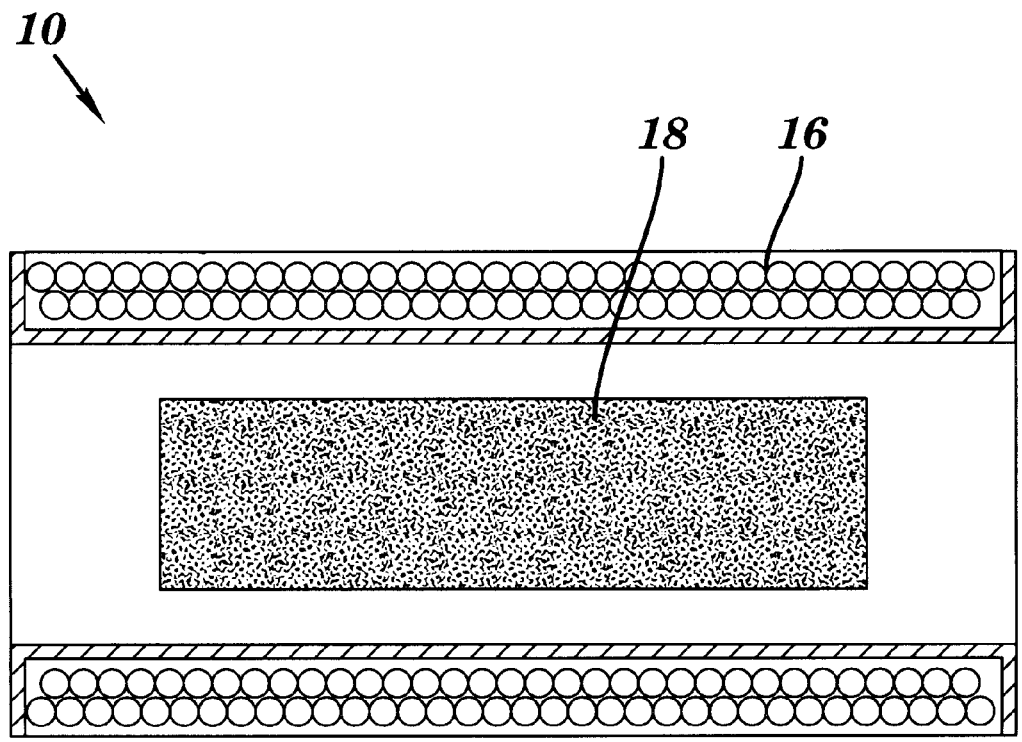
FIG. 2 is a schematic elevational, cross-sectional view of a prior art driver for use in Coriolis flowmeters.

Turning to FIG. 2, driver 10 generally comprises a coil 16 and a ferromagnetic core 18. One of the coil 16 and core 18 is provided with mounting hardware (not shown) sufficient to secure it to support 22 (FIG. 1), while the other of the coil and core is provided with hardware (not shown) sufficient to mount it to flow tube 14 (FIG. 1). Core 18 is adapted to oscillate in a conventional manner upon excitation of the coil 16 by an alternating current source (not shown) to, in turn, vibrate flow tube 14.

Referring to FIGS. 5 and 6, transducer 110 of the subject invention includes a piezoelectric element 118 bonded to a wall portion of flow tube 14. In a preferred embodiment as shown a pair of piezoelectric elements 118 are disposed on opposite sides of the flow tube 14. One element 118 may serve as a driver, the other, 118', as a sensor, or alternatively, the piezoelectric crystals may be driven 180 degrees out of phase to both serve as drivers. In the embodiment shown, piezoelectric elements 118 and 118' are substantially planar crystals, which are bonded, such as by a suitable epoxy or other adhesive, to an adapter pad 28 which as shown, includes a semi-cylindrical surface sized and shaped to receive a wall portion of flow tube 14 in superimposed engagement therewith as shown in FIGS. 5 and 6. Adapter pads 28 are preferably brazed or welded to the tube 14. Similar elements 118 may be disposed elsewhere along flow tube 14 to serve as sensors and/or additional drivers. Electrode leads 20 and common lead 21 provide contact to operational circuitry or processor 42 as described hereinbelow.

Figure 3:
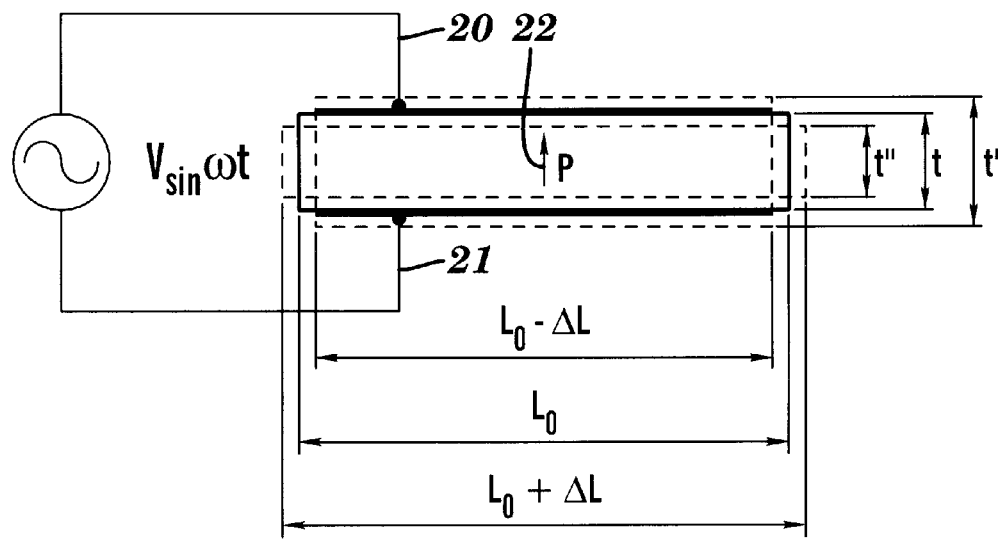
FIG. 3 is a schematic representation of a circuit including a transducer of the present invention.
Figure 4:
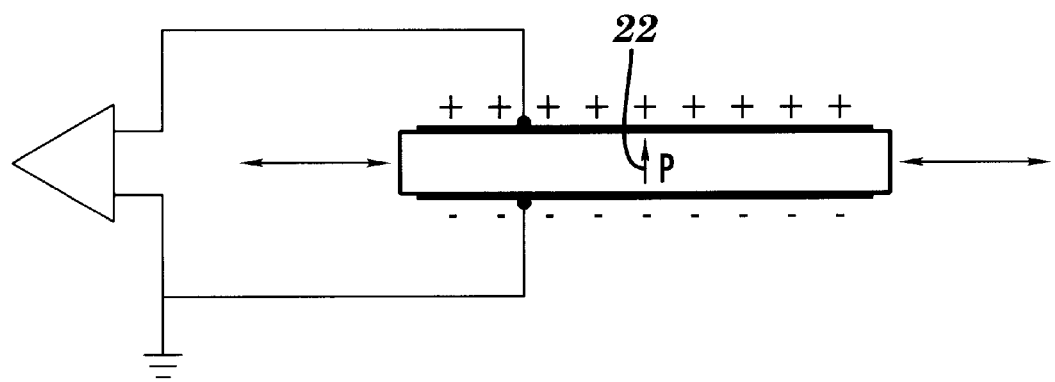
FIG. 4 is a schematic diagram of the transducer of FIG. 3 showing its polarization during operation.

Turning now to FIGS. 3 & 4, piezoelectric element 118 is a conventional piezoelectrical crystal which is polarized through its thickness t along a polarization axis 22. As shown in FIG. 3, when piezoelelctric element 118 is subjected to an electric field across its thickness, the element experiences a change in thickness, length and width (not shown). As shown, a piezoelectric element 118 having an original length $l_o$, when subjected to an alternating voltage across electrode leads 20 and 21, will vary in length from $l_o$ minus $\Delta l$ to $l_o$ plus $\Delta l$ and will vary in thickness t from t' to t" as shown in phantom. This change in length is used in transducer 110 to expand one portion of the side wall of tube 14 relative to the opposite side of tube 14 to generate bending as shown in phantom in FIG. 5. As discussed hereinabove, a pair of transducers 118 and 118' may be mounted on opposite sides of the tube, as shown, and driven 180 degrees out of phase so that as one piezoelectric element 118 is expanding in the axial direction the opposite element 118 is contracting axially.

Conversely, as shown in FIG. 4, if element 118 experiences a stress which causes its length to change, the element generates an electric field along its polarization axis 22 which can be sensed by conventional circuitry as shown. In this manner, a piezoelectric element 118 may be utilized as a sensor for a Coriolis tube. In the embodiment shown, piezoelectric element 118 may serve as a driver, while element 118' serves as a sensor.

Figure 10:
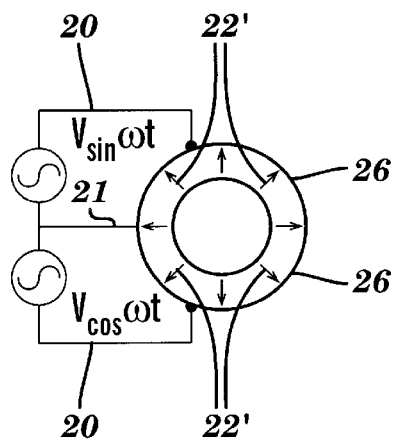
FIG. 10 is an elevational front view of the transducer of FIG. 9 including a schematic representation of an operational circuit thereof.
Figure 8:
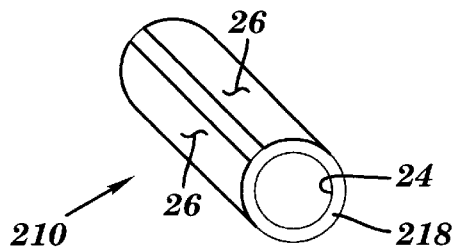
FIG. 8 is a perspective view of an alternate embodiment of the transducer of FIGS. 5 & 6.
Figure 11:
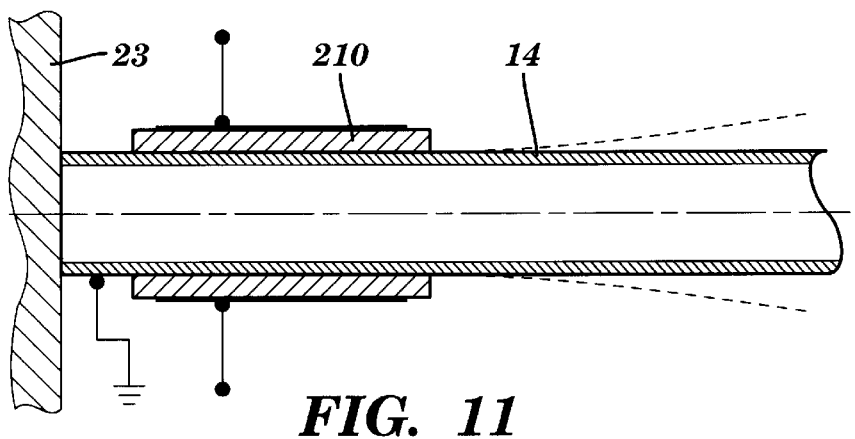
FIG. 11 is a cross-sectional view similar to that of FIG. 5 of the transducer of FIGS. 8–10.
Figure 12:
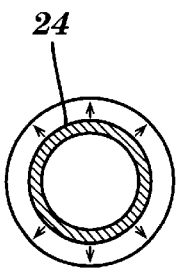
FIG. 12 is a cross-sectional elevational front view of the transducer and flow tube of FIG. 11.

Turning now to FIGS. 8–12, an alternate embodiment of a transducer of the present invention is shown as a tubular transducer 210 which is radially polarized as indicated by polarization axes 22' in FIG. 10. As shown, electrode ground 21 is connected to a center electrode 24 which extends completely about the id (inner diameter) of tubular element 210 and thereby serves as a common electrode. Electrode leads 20 are connected to outer electrodes 26 formed as discreet semi-cylindrical halves. Transducer 210 may be coaxially disposed on tube 14 as shown in FIGS. 11 and 12 by sliding transducer 210 onto an end of the tube 14. Alternatively transducer 210 may be fabricated as two discreet semi-cylindrical portions to permit installation of each semi-cylindrical portion independently of the other. Once in position as shown in FIGS. 11 and 12, an alternating voltage may be applied to the two semi-cylindrical portions of transducer 210, 180 degrees out of phase relative to one another in the manner described hereinabove with respect to transducer 110. This generates bending of tube 14 in an oscillatory manner as shown in phantom in FIG. 11. Conversely, if the tube 14 is bent, one semi-cylindrical half of the tube will produce a voltage in the portion of transducer 210 which is out of phase with the other semi-cylindrical portion of transducer 210. Transducer 210 thus may be operated with both semi-cylindrical portions being used as drivers, with both portions being used as sensors, or as a combination driver/sensor where one semi-cylindrical portion used to drive leaving the other semi-cylindrical portion to sense.

Piezoelectric transducers 110 and 210 of the present invention provide a high force, low compliance transducer in contrast to conventional Coriolis/coil drivers which tend to be low force high compliance devices. Advantageously this enables the transducers of the present invention to be disposed where bending stresses are high (typically near mechanical ground 23). In this manner, the mass of the transducer has a relatively small effect on either the drive mode or Coriolis force sensing mode resonance frequencies. Moreover, these piezoelectric transducers have very low mass as compared to conventional coil/mass devices. This may be particularly advantageous for use on Coriolis flowmeters having relatively small flow tubes.

In addition, since transducers 110 and 210 are mounted relatively close to the mechanical ground 23, electrical leads 20 and 21 are relatively short, and require little or no fastening of these leads to tube 14. Typically on Coriolis flowmeters with conventional electromagnetic drivers and sensors the leads are fastened to the tube at close intervals using adhesive tape or other suitable adhesives. This aspect of the present invention advantageously minimizes any effect the leads otherwise may have on tube vibration, as well as simplifying manufacturing of the Coriolis flow tubes and improving reliability.

As also shown, piezoelectric transducer 110 and 210 is mounted entirely on a single flow tube 14 as shown in FIGS. 5 and 11. No part of this transducer need be mounted on another flow tube or mechanical ground. This provides significant advantages in terms of isolating the drivers and sensors from external influences, such as in the case of single tube Coriolis flowmeters. Alternatively, if desired, transducers 110 and 210 of the present invention may be mounted to a second flow tube or a mechanical ground, as will be discussed hereinbelow. These advantages are provided by use of such high force low compliance transducers oriented to provide movement, i.e. expansion and contraction, in a direction substantially orthogonal to the amplitude direction of the flow tube direction. This contrasts with conventional drivers/sensors such as shown in FIG. 2 in which movement of the core 18 relative to coil 16 is effected in a direction generally parallel to the amplitude of tube vibration. The present invention also advantageously provides for reduced hysteresis relative to prior art coil/core devices.

Piezoelectric element 118 is thus adapted to oscillate coaxially with tube 14, along axis 19, to alternately expand and contract the wall of tube 14 in response to excitation of the element 118. Piezoelectric element 118 is provided with a size predetermined to generate bending in a tube 14 of predetermined size and shape. Moreover, by providing a relatively small, oscillating mass as described, rather than a relatively large, inertially stable mass as utilized by Kalotay as discussed hereinabove, the present invention advantageously provides a compact configuration. This aspect enables the present invention to be particularly useful in applications where small size is desired, such as with small diameter flowtubes, e.g. 0.0625 in. (0.159 cm), or in compensation applications in which the driver is preferably disposed within a housing of the flowmeter to be compensated, as will be discussed in greater detail hereinafter.

The size of the transducers 110 and 110' are predetermined to generate a desired level of bending of the tube 14 when used as a driver, or to generate desired voltage levels when used as a sensor. One skilled in the art will recognize that conventional finite element analysis is preferably utilized for this purpose. Such analysis would take into account: crystal geometry and modulus, appropriate piezoelectric coefficients, moment of inertia of the crystal relative to the neutral bending axis of tube 14, the location of the crystals along the tube length, the moment of inertia of the tube about its neutral bending axis, the tube shape (i.e. straight, U-shaped, bow tie, etc.) and length, and modulus of elasticity of the tube. Mechanical Q of the flowmeter must be determined experimentally and then used to determine displacements and generated voltages when the tube is driven at its resonant frequency. In this regard, if the piezoelectric crystal is excited at the resonant frequency of the tube rather than at a much lower frequency, then the amplitude of motion of the tube is amplified by the mechanical Q of the resonant system (i.e. the resonant amplitude of tube bending is equal to Q×static bending of the tube). Such analysis is familiar to the skilled artisan.

Figure 7:
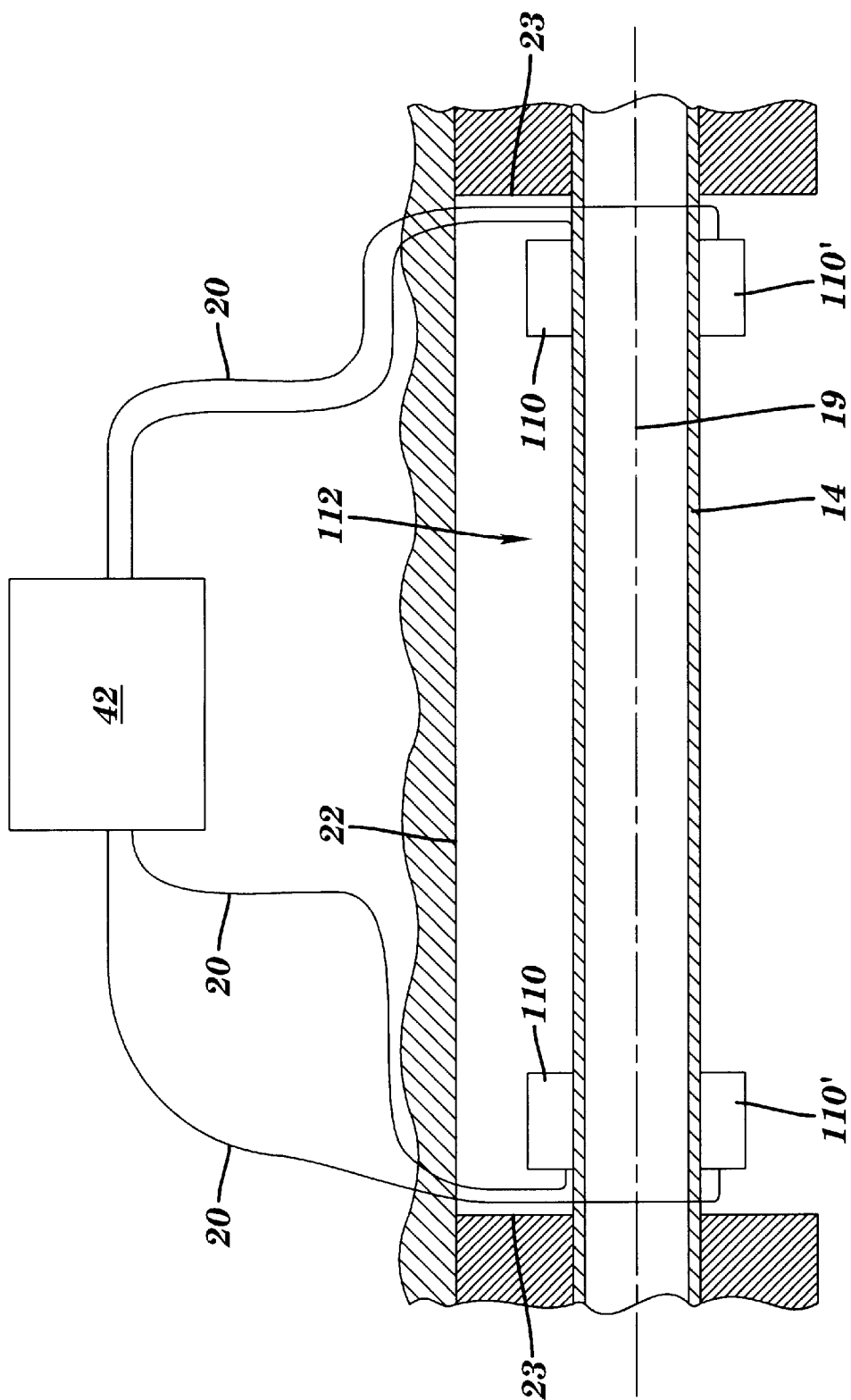
FIG. 7 is a cross-sectional view similar to that of FIG. 1, of a straight tube Coriolis flowmeter utilizing the Coriolis driver of FIGS. 5 & 6.
Figure 9:
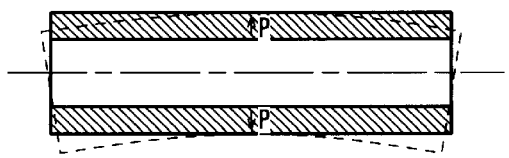
FIG. 9. is a cross-sectional elevational side view of the transducer of FIG. 8.

As shown in FIG. 7, in one representative example of a Coriolis flow meter incorporating the present invention, transducer 110 is rigidly disposed on flow tube 14, without being secured to support or mechanical ground 22. This disposition is accomplished by fastening piezoelectric element 118 or 218 to the flow tube 14 substantially as shown and described with respect to FIGS. 5, 6, 11 and 12. During operation, the element changes length in an oscillatory manner to apply a known repeatable bending force to flow tube 14 to either drive or compensate Coriolis flowmeter 112.

Use of transducer 110 to compensate the flowmeter includes use of the driver to simulate forces generated during mass flow through a flow tube of a flowmeter. For example, the driver may be used to apply an oscillating force to a conventional Coriolis flowmeter to provide either a continuous or a scheduled calibration, or calibration verification. Use of the free standing transducer 110 advantageously provides a force that is not influenced by external effects transmitted to the tube due to a grounded reference.

In one embodiment of this approach, flow through the flowmeter is shut off and one or more transducers 110 are disposed at position(s) on the flow tube predetermined to provide optimal excitation of the flow tube. Transducers 110 then may be operated to provide a known reference force which is 90 degrees out of phase from the drive signal to simulate fluid flow through the flow tube. The actual response then may be compared to the expected response.

Any discrepancy between these values may be used to signal for corrective action.

In another embodiment, reference forces may be applied during constant fluid flow through the flowmeter. The reference forces would be generated sequentially to simulate a slight forward, then a slight reverse flow. In this regard, flow at time 1 ($Flow_{T1}$) should equal $Flow_0$ of the fluid+the simulated flow ($Flow_{SIM}$). Flow at time 2 ($Flow_{T2}$) should equal $Flow_0$-$Flow_{SIM}$. Subtracting these equations yields:

$$Flow_{T1}-Flow_{T2}=2\times Flow_{SIM}$$

If $Flow_{SIM}$ is not the expected value, then corrective action may be initiated.

In this manner, the present invention may be utilized to apply a predetermined vibration to a conventional Coriolis flowmeter for calibration, verification or certification purposes. An example of a conventional Coriolis flowmeter which may utilize transducer 110 in this manner is disclosed in commonly assigned U.S. Pat. No. 5,271,281 to Mattar, et al. entitled CORIOLIS-TYPE MASS FLOWMETER ("Mattar, et al.") which is hereby fully incorporated by reference herein. As discussed, the compact construction of the present invention enables it to be permanently mounted within the housing of such a flowmeter for convenient use.

Figure 13:
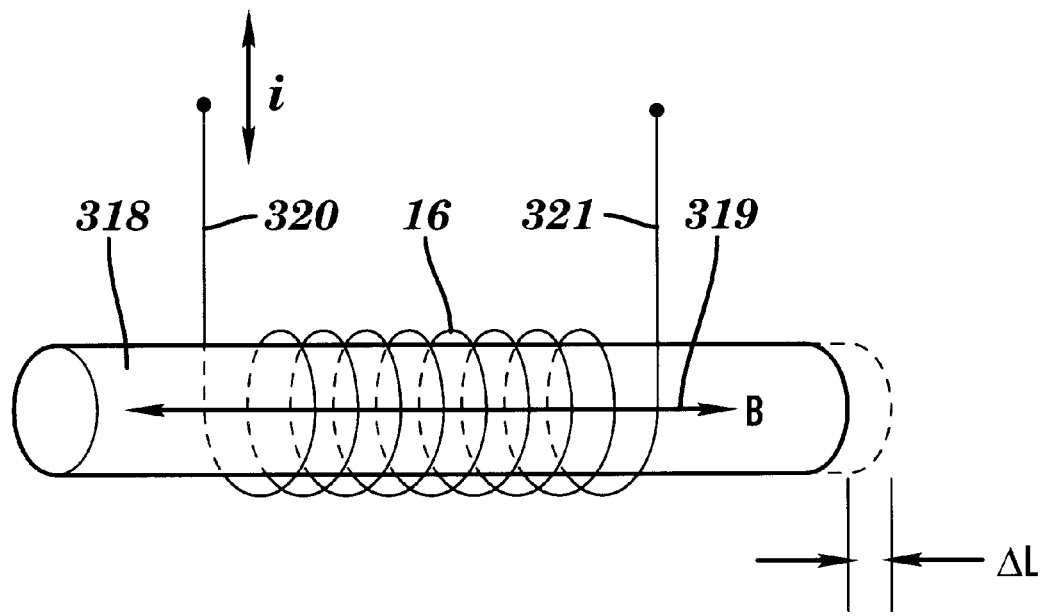
FIG. 13 is a schematic representation of another embodiment of the transducer of the present invention; during operation as a driver.
Figure 14:
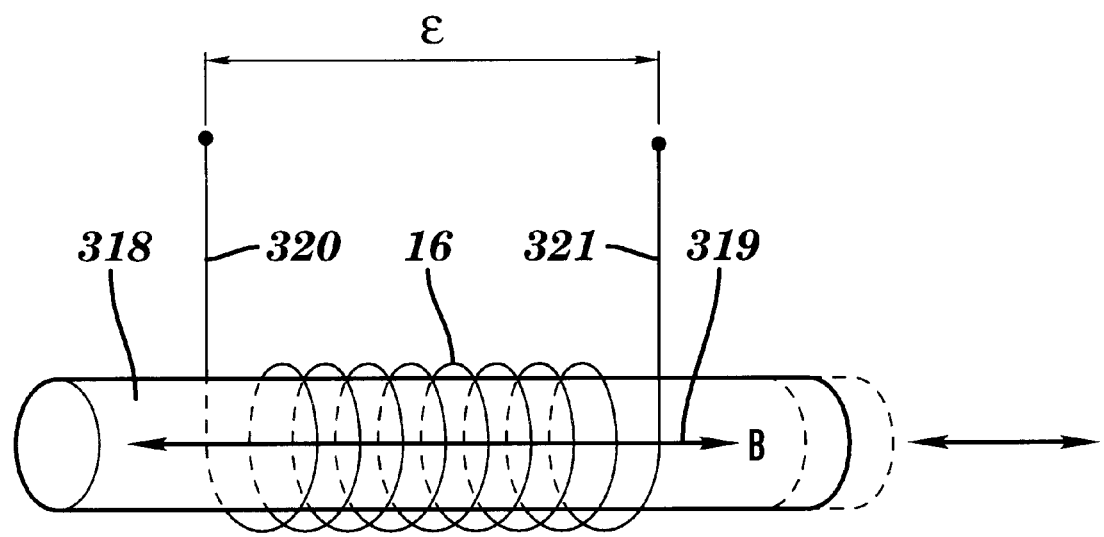
FIG. 14 is a schematic representation of the transducer of FIG. 13, being operated as a sensor.

Turning now to FIGS. 13–15, an alternate embodiment of the present invention includes transducer 310. This embodiment is substantially similar to transducers 110 and 210, with the exception of utilizing a magnetostrictive element 318.

Turning now to FIG. 13, when a magnetostrictive element 318 such as a rod or bar of ferromagnetic material or certain ferrite materials is subjected to a magnetic field B, which is generated as a result of current "i" through coil 16, it experiences a change in length Δl along axis 319. Nickel and the alloy permendur are examples of ferromagnetic alloys which exhibit particularly strong magnetostrictive effects and are thus suitable for use in the present invention. The change in length is independent of the direction of magnetic field B. Therefore if element 318 is subjected to an alternating magnetic field along its axis, the rod oscillates at twice the frequency of the applied field. Moreover, the wave form of the strain generated within element 318 will be a rectified sine wave which includes unwanted harmonics thereby driving the Coriolis tube with multiple frequencies. To overcome this, the present invention utilizes a permanent magnet 30 as shown in FIG. 15 to supply a d.c. bias field Bb which is greater than the amplitude of the a.c. field Bsinwt generated by the coil 16. Thus the d.c. bias field serves to elevate the sum of the fields Bb+Bsinwt such that a polarity change does not occur. This results in a sinusoidal waveform of the strain having the same frequency as the applied alternating current i. The d.c. bias field also results in increased energy output since the magnetostrictive effect increases in the presence of a d.c. field. Although as shown, a magnet 30 is utilized, any convenient approach may be utilized to provide the d.c. bias field, such as for example, applying a suitable d.c. bias current to the coil 16, as discussed hereinbelow.

Conversely, as shown in FIG. 14, when a mechanical stress is applied along axis 319, with sufficient force to either shorten or lengthen element 318, a change in the intensity of magnetic induction occurs in element 318.

This causes a change in the flux passing through the sense coil 16 which in turn causes a voltage to be induced in coil 16. A d.c. bias field is also beneficial in the design of the sensor since in general the change in magnetic induction as a result of applied stress is greatly enhanced and hence the alternating voltage induced in the sense coil is increased.

Turning now to FIG. 15, transducer 310 includes brackets 32 fastened to the wall of tube 14 proximate mechanical ground 23 in the manner discussed herein above with respect to transducers 110 and 210. Brackets 32 are fastened to tube 14 in any suitable manner such as by welding or brazing. Magnetostrictive element 318 is rigidly attached to the tube brackets 32 so that axis 319 thereof extends substantially parallel to axis 19 of the tube 14. The brackets 32 are fabricated from a ferromagnetic material and preferably extend radially outward beyond element 319 to form a magnetic circuit as will be discussed herein below. As shown, magnet 30 is disposed on a terminal end of one of the brackets 32, and a ferromagnetic pole or extension 35 extends from the terminal portion of the other bracket 32 generally parallel to axes 19 and 319 towards magnet 30. The use of ferromagnetic material for the brackets and pole 35 serves to provide a magnetic circuit which includes element 318.

Magnetostrictive transducer 310 provides similar advantages to those of piezoelectric transducers 110 and 210, in that it is a high force/low compliance transducer. This allows for the application of transducers where bending stresses are high, typically near mechanical ground. Electrical leads 320, 321 are relatively short and require little or no fastening of these leads to tube 15. The mass of the transducer has a relatively small effect on the drive and Coriolis mode resonant frequencies of the tube. Magnetostrictive transducers 310 can be mounted entirely on single flow tube 15 as shown in FIG. 15 or fastened to both tube 15 and mechanical ground 23.

As discussed herein above the transducers 110, 210 and 310 of the present invention are disposed proximate the mechanical ground of the Coriolis flow tube 14. In a preferred embodiment the transducers are disposed closer to the mechanical ground than to the anti-node or point of maximum displacement of the flow tube 14. An air gap 36 is disposed between pole piece 35 and the magnet 30 to provide freedom of movement there between to avoid restriction or interference during expansion and contraction of the magnetostrictive element 318.

Turning now to FIG. 16, in a further alternate embodiment of the present invention, a transducer 310' is substantially similar to transducer 310, while being fastened both to tube 14 and to mechanical ground 23. As shown, one of the brackets 32 is fastened to mechanical ground 23 such as by welding or brazing.

A magnetostrictive driver 310 and sensor 310' may be sized in a manner similar to that of piezoelectric transducer 110 and 110'. Preferably, a finite element analysis would be undertaken which would take into account the magnetostrictive and mechanical properties of the magnetostrictive element, the relevant properties and geometries of the various components of the magnetic circuit including coil, permanent magnet, pole pieces, air gap and magnetostrictive element, the moment of inertia and modulus of elasticity of both the element and tube, tube shape and length. The mechanical Q may be determined experimentally and then used to determine displacements and generated voltages when the tube is driven at its resonance frequency.

In operation of a Coriolis flowmeter 112 (as shown in FIG. 7), transducers 110 or alternatively, transducers 210, 310, or 310', are adapted to vibrate flow tube 14 at a predetermined resonance frequency. In a preferred embodiment, a pair of transducers, such as transducers 110, are located at opposite ends of a portion of tube 14 and operated in parallel to help vibrate the tube uniformly. This resonance frequency is predetermined based on the physical parameters of the flowmeter and fluid flowing therethrough. The value of the frequency may be calculated using these parameters, or may be read from memory, i.e. a Read-Only-Memory (ROM), of a computational means, such as a microprocessor based microcontroller or computer 42 (FIG. 7). The resonance frequency may vary during operation due to changes in various parameters such as the temperature and density of the fluid flowing through the flowmeter. The control unit thus preferably adaptively controls the resonance frequency by a closed loop feedback system. In the event a closed loop system is preferred, an additional sensor (not shown) may be utilized to provide feedback sufficient to modulate the excitation current being fed to the transducers from microcontroller 42. Such driver feedback alternatively may be provided by intermittently reversing operation of transducers 110 to serve as sensors. This latter approach may be accomplished by periodically disconnecting the driver current source from the transducers 110 during oscillation of the driver, measuring the response generated in the transducers due to the oscillation for one or more oscillatory cycles, then reconnecting the driver current source.

Still further, transducers 110' utilized to determine mass flow rate may be utilized to provide this feedback. This may be accomplished in the manner set forth in the above-referenced patent to Mattar, et al. utilizing conventional algebraic techniques.

The flowmeter may determine mass flow rate therethrough in any convenient manner. In a preferred embodiment, for example, a pair of transducers 110' may be utilized as sensors to determine the phase shift of vibration of flow tube 14 between the locations thereof. This may be accomplished in a manner familiar to those skilled in the art, such as disclosed by Kalotay as referenced hereinabove. One method for calculating mass flow rate, which is familiar to those skilled in the art is as follows:

Output $S_1$ of a first sensor 110' positioned on one side (i.e. at an upstream end) of a straight tube Coriolis flowmeter 112, is provided by the equation:

$$S_1 = |S_D|\text{SIN}(\omega t) + |S_C|\text{COS}(\omega t)$$

where $\omega$ is the frequency of the oscillation, $|S_D|\text{SIN}(\omega t)$ represents the drive component of the oscillation, and $|S_C|\text{COS}(\omega t)$ represents the Coriolis component of the oscillation. Similarly, the output $S_2$ of a second sensor 110' positioned on the opposite side (i.e. the downstream end) of the flowmeter, is provided by the equation:

$$S_2 = |S_D|\text{SIN}(\omega t) - |S_C|\text{COS}(\omega t)$$

These equations may be combined to yield the relationships:

$$S_1 - S_2 = 2|S_C|\text{COS}(\omega t) \text{ and } S_1 + S_2 = 2|S_D|\text{SIN}(\omega t).$$

Further algebraic manipulation of these relationships yields the following equation for mass flow rate:

$$\dot{m} = const \times \frac{|S_C|}{|S_D|\omega} = const \times \frac{|S_1 - S_2|}{|S_1 + S_2|\omega}$$

Further, the character $\phi$ denotes the phase difference between $S_1$ and $S_2$, and TAN $(\phi/2) = S_C/S_D$. For small angles $\phi$, $(\phi/2)$ is approximately equal to $S_C/S_D$, to yield the relationships:

$$\text{TAN}\left(\frac{\phi}{2}\right) = \frac{S_C}{S_D}$$

for $\phi$ small $$\frac{\phi}{2} \approx \frac{S_C}{S_D}$$

$$\dot{m} = const \times \frac{|S_C|}{|S_D|\omega} \approx const \times \frac{\phi}{2\omega}$$

The signals from sensors 110' thus may be communicated by suitable leads 20 to conventional processing circuitry such as a common microcontroller 42 to calculate mass flow rate information therefrom in a convenient manner, such as herein described.

Alternatively, as also disclosed by Kalotay, flowmeter 112 may utilize a single sensor 110' disposed proximate a zero flow node point of flow tube 14. Displacement of this sensor during flow through tube 14 then may be utilized to calculate the mass flow rate.

Figure 17:
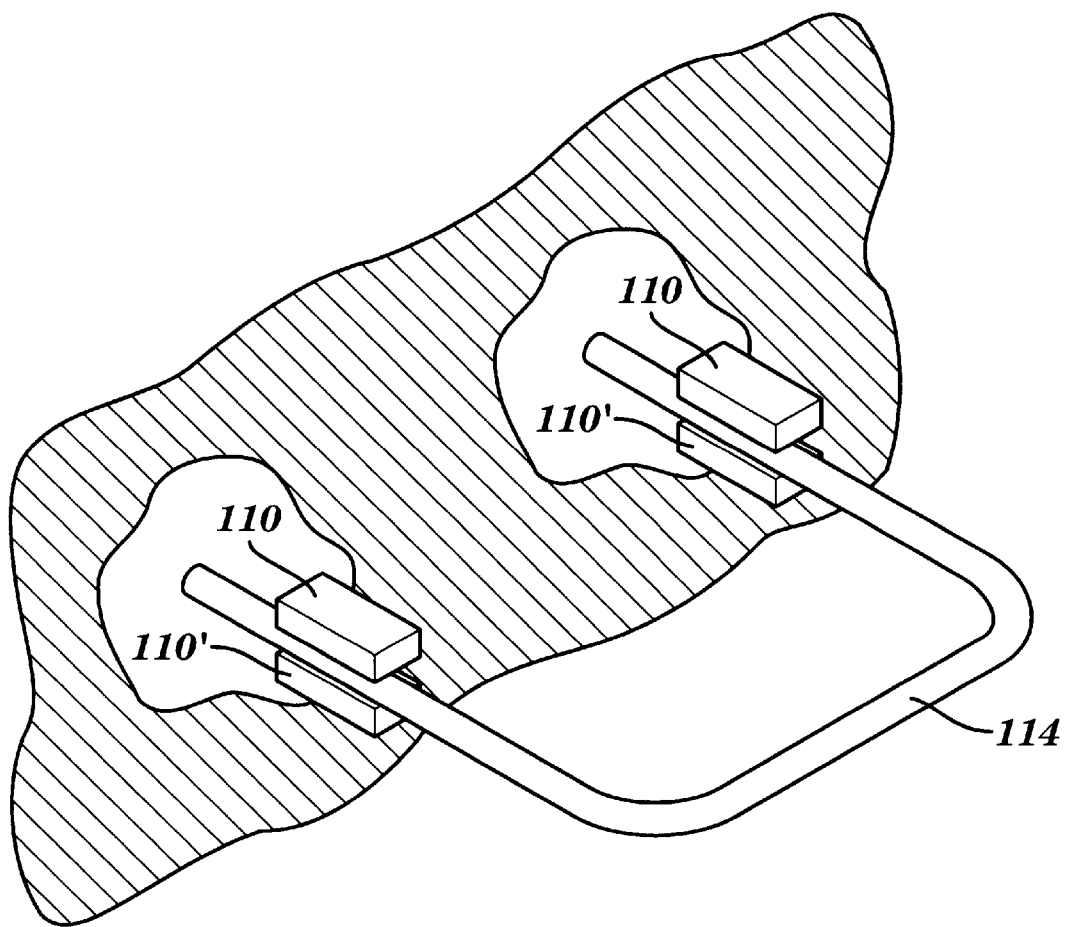
FIG. 17 is a perspective view of a further embodiment of a Coriolis flowmeter incorporating the present invention.

As a further alternative, transducers 110, 210, 310 or 310' may be disposed on a substantially circular or U-shaped flow tube 114 (as shown in FIG. 17) to vibrate the tube between parallel planes on either side of its static plane in the manner generally disclosed by Herzl as also referenced hereinabove. Sensors 110' measure torsional forces on flow tube 114 generated by Coriolis forces during flow through the tube. Outputs of the sensors may then be applied to a differential amplifier whose output would be proportional to the mass flow rate of the fluid.

Although primarily described herein with respect to a single flow tube 14 of circular transverse cross-section, one skilled in the art should recognize that the present invention may be practiced with one or more flow tubes of substantially any configuration, i.e. curved or straight flow tubes having circular or non-circular transverse cross-sections, without departing from the spirit and scope of the invention.

EXEMPLIFICATION

The following examples are meant to give an approximate idea of the displacements, forces and voltages which can be generated by specific piezoelectric and magnetostrictive drivers and sensors of the present invention. To predict displacements, resonant frequencies, voltages and phase shifts due to mass flow for driver and sensor configurations attached to Coriolis flowtube configurations, finite element analysis should be employed as the analysis becomes complex.

EXAMPLE 1

Piezoelectric Driver

The following gives an estimate of the displacements and forces which can be generated by a piezoelectric crystal of a particular size and for a given excitation voltage. If the crystal is unrestrained then it would elongate as follows:

delta L=L*d31*V/t (note delta L is sinusoidal if V is sinusoidal)

For L=0.025 meters (1 inch) crystal length t=0.0015 meters (0.06 inch) crystal thickness V=20 volts drive voltage For PZT-5A (a commonly used lead zirconate lead titanate ceramic compound manufactured by the Vernitron division of Morgan Matroc Inc.) the piezoelectric coefficient d31 relates the strain developed in the plane of the crystal for an electric field applied perpendicular to this plane.

d31=1.7E−10 meters/meter/volt/meter (6.8E−9 inches/inch/volt/inch)

delta L=2.26E−6 inches or 5.7E−8 meters

If, rather than unrestrained, the crystal is restrained by being bonded to an element which is much stiffer than itself, then it would generate a force approximately equal to the unrestrained elongation times crystal cross sectional area times crystal modulus divided by crystal length.

Fr=delta L*A*E/L=L*d31*V*w*t*E/(t*L) (note Fr is sinusoidal if V is sinusoidal)

w=0.0047 meters (0.188 inch) width of the crystal

E=7.1E10 N/m^ (1E7 psi) modulus of elasticity of the crystal

A=w* t cross sectional area which simplifies to

Fr=w*E*d31*V

Fr=1.1 newtons or 0.25 lbs

A general insight into how much bending moment is experienced by the flow tube is given by the following approximate relations:

M=h*Fr*Ktube/(Ktube+Kxtal) where Ktube and Kxtal represent the bending stiffness of the tube and crystal which in general are proportional to the product of the modulus of elasticity and the moment of inertia of the tube Et*It, and crystal Ex* Ix and "h" is the distance between the plane of the crystal and the neutral axis of bending of structure including the flowtube with drivers and sensors attached.

Finite element analysis is best employed to obtain an accurate estimate of deflections, resonant frequencies, coriolis forces and phase shifts generated due to mass flow.

EXAMPLE 2

Piezoelectric Sensor

The following provides an estimate of the voltage generated across the faces of a crystal if a stress of 1000 psi (7.1E6 newtons/sq.m) is imparted to the crystal parallel to length of the crystal. The crystal would experience a stress along its length when attached to a bending tube. It can be shown that the voltage generated is:

V=g31*t* stress (note V is sinusoidal if stress is sinusoidal)

The Piezoelectric coefficient g31 relates the electric field developed perpendicular to the applied stress. For PZT-5A:

g31=11.4E−3 volt/meter/newton/sq. meter (2 volt/in/lbf/sq in)

assume t=2.5E−4 meters (0.010 inch)

V=20 volts

EXAMPLE 3

Magnetostrictive Driver

The following gives an estimate of the displacements and forces which can be generated by a magnetostrictive rod of a particular size upon the application of a magnetic field parallel to the axis of the rod as would be generated by an electrical current passed through the coil wrapped around the rod. The basic analysis is very similar to that for a piezoelectric crystal. If the magnetostrictive rod is unrestrained then it would elongate as follows:

delta L=L*alpha*B (note delta L is sinusoidal if B is sinusoidal)

Assume L=0.025 meters=1 inch

The magnetostrictive coefficient alpha relates the strain developed for an applied magnetic field. An approximate value of alpha for nickel is:

alpha=2.9E−9 meter/meter/gauss or 2.9E−9 in/in/gauss assume B=300 gauss delta L=0.87E−6 inches (2.2E−8 meters)(note delta L is sinusoidal if B is sinusoidal)

If, rather than unrestrained, the magnetostrictive rod is restrained by being attached to a much stiffer element than itself, then it would generate an approximate force equal to the unrestrained elongation times cross sectional area of magnetostrictive rod times modulus of elasticity divided by length.

Fr=delta L*A*E/L=L*alpha*B*A*E/L=alpha*B*A*E (note Fr is sinusoidal if B is sinusoidal)

As above B=300 gauss and alpha=2.9E−9 m/m/gauss or in/in/gauss

E=3E7 psi

A=cross section area=0.0123 sq. in.(7.7E−6 sq m)(this is a ⅛ inch dia. rod.)

Fr=0.32 lbs (1.42 newtons)

A general insight into how much bending moment is experienced by the flowtube is given by the following approximate relations:

M=h*Fr*Ktube/(Ktube+Kr) where Ktube and Kr represent the bending stiffness of the tube and the magnetostrictive rod which in general are proportional to the product of the modulus of elasticity and the moment of inertia of the tube Et*It and the rod Er*Ir and "h" is the distance between the axis of the magnetostrictive rod and the neutral axis of bending of the structure including the flowtube with drivers and sensors attached.

Again finite element analysis is best employed to give accurate estimates of deflections, resonant frequencies, and coriolis forces, and phase shifts generated due to mass flow.

EXAMPLE 4

Magnetostrictive Sensor

The following gives an estimate of the voltage generated at the sensor if an alternating stress of 1000 psi (7.1E6 newtons/sq. m) at 400 hz is imparted to the magnetostrictive rod along its length. The rod would experience a stress along its length when attached to a bending tube.

V=1E−8* N*(dB/dt)*A=1E−8* N*(gamma)*(dstress/dt)*A

A voltage is generated in the sensing coil as a result of the changing magnetic flux passing through it. (dB/dt)*A is the rate of change of magnetic flux passing through the coil.

Gamma=dB/dstress=magnetostrictive coefficient (change in rod flux density per change in applied stress)

CGS units: volts, gauss, sq. cm, dynes/sq. cm, sec

For 45 permalloy an approximate value is:

gamma=2.1E−5 gauss/dyne/sq. cm (1.45 gauss/psi) for 1000 psi stress (6.9E7 dynes/sq cm)

dstress/dt=2*pi*f* stress=2*3.1416*400 hz*1000 psi 2.5E6 psi/sec=1.7E11 dynes/sq cm/sec Area of ⅛" dia rod in sq. cm is 0.079 sq. cm Assume N=1000 turns (no. Of turns on coil)

V=2.9 volts

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A transducer for a Coriolis flowmeter having a flow tube adapted for vibration at a resonance frequency to determine mass flow rate of a fluid passing through the tube, the resonance frequency having an amplitude direction orthogonal to a longitudinal axis of the flow tube, said transducer comprising:

a strain element disposed in operative engagement with a wall of the flow tube, said strain element adapted to selectively generate and sense the vibration of the flow tube by periodic expansion and contraction in the axial direction.

2. The transducer of claim 1, wherein the strain element is bonded to a portion of the wall of the flow tube disposed closer to a node than to a peak amplitude of the vibration.

3. The transducer of claim 1, wherein said strain element is adapted to selectively generate and sense the vibration of the flow tube by periodic expansion and contraction of at least a portion of the wall.

4. The transducer of claim 3, being disposed integrally with the wall, wherein said transducer is a solid state device being free from moving parts.

5. The transducer as set forth in claim 1, wherein said transducer comprises a driver, said transducer being adapted for excitation by an alternating current power source so that said driver is adapted to vibrate said flow tube.

6. The transducer as set forth in claim 5, wherein said driver further comprises a calibration/verification driver adapted to simulate mass flow through the flowmeter.

7. The transducer as set forth in claim 1, wherein said transducer comprises a sensor, said sensor being adapted to generate an output signal in response to said periodic expansion and contraction of the flow tube upon disconnection of said power source therefrom.

8. The transducer as set forth in claim 1, wherein the Coriolis flowmeter determines mass flow rate by measuring deflection of the flow tube during mass flow therethrough.

9. The transducer as set forth in claim 1, wherein the Coriolis flowmeter determines mass flow rate by measuring torsional deflection of the flow tube during mass flow therethrough.

10. A transducer for a Coriolis flowmeter having a flow tube adapted to vibrate at a predetermined resonance frequency to determine mass flow rate of a fluid passing therethrough, said transducer comprising:

a piezoelectric element bonded to at least one portion of a wall of the flow tube;

said piezoelectric element adapted to selectively generate and sense strain in the wall portion in a direction parallel to a longitudinal axis of the flow tube, wherein the strain corresponds to the tube vibration.

11. The transducer of claim 10, wherein said piezoelectric element further comprises a semi-cylindrical surface adapted to receive the at least one wall portion therein.

12. A transducer for a Coriolis flowmeter having a flow tube adapted to vibrate at a predetermined resonance frequency to determine mass flow rate of a fluid passing therethrough, said transducer comprising:

a magnetostrictive element disposed on at least one portion of a wall of the flow tube;

said magnetostrictive element adapted to selectively generate and sense strain in said at least one wall portion in a direction parallel to a longitudinal axis of the flow tube, wherein the strain corresponds to the tube vibration.

13. The transducer of claim 12, further comprising a magnet for supplying a bias field and disposed in operative engagement with said magnetostrictive element.

14. A Coriolis flowmeter having a flow tube adapted for vibration at a resonance frequency to determine mass flow rate of a fluid passing through the tube, the resonance frequency having an amplitude direction orthogonal to a longitudinal axis of the flow tube, adapted to determine mass flow rate of a fluid therethrough, said Coriolis flowmeter comprising:

a flow tube;

a driver having a strain element disposed in operative engagement with the flow tube at a first location, said strain element adapted to selectively generate and sense the vibration of the flow tube by periodic expansion and contraction in the axial direction, said driver being disposed on said flow tube and adapted to vibrate said flow tube at a predetermined resonance frequency;

at least one sensor disposed on said flow tube, at a second location spaced from said first location said sensor being adapted to generate an output signal corresponding to vibration of the flow tube thereat; and computational device adapted to receive the output signal and determine the mass flow rate.

15. The Coriolis flowmeter as set forth in claim 14, wherein the Coriolis flow meter is adapted to determine the mass flow rate by measuring phase shift of vibrations of the flow tube between said first and second locations thereon.

16. The Coriolis flowmeter as set forth in claim 14, wherein said driver is adapted for selectively serving as a second sensor adapted to generate a second output signal corresponding to vibration of the flow tube thereat for control of said driver.

17. A method for vibrating a flow tube of a Coriolis flowmeter at a predetermined resonance frequency to determine the mass flow rate of a fluid passing therethrough, the resonance frequency having an amplitude direction orthogonal to a longitudinal axis of the flow tube, said method comprising the steps of:

(a) providing a transducer having an elongated strain element;

(b) rigidly disposing the strain element on the flow tube;

(c) applying an alternating current to the strain element, wherein the strain element is oscillated.

18. The method as set forth in claim 17, further comprising the step of maintaining the transducer in contact with a mechanical ground which is stationary relative to said flow tube.

19. The method as set forth in claim 17, further comprising the step of maintaining the transducer free from contact with a mechanical ground which is stationary relative to said flow tube.

20. The method as set forth in claim 17, wherein the transducer comprises a piezoelectric element.

21. The method as set forth in claim 17, wherein the transducer comprises a magnetostrictive transducer having a magnetostrictive strain element with a coil disposed in operative engagement therewith, said applying step (c) further comprising applying an alternating current to the coil to apply an alternating flux to the magnetostrictive strain element.

22. A method for determining mass flow rate of a fluid passing through a flow tube, said method comprising the steps of:

(a) providing a transducer having an elongated strain element;

(b) rigidly disposing the strain element on the flow tube;

(c) applying an alternating current to the strain element, wherein the strain element is oscillated to vibrate the flow tube at a resonance frequency;

(d) disposing at least one sensor on the flow tube, the at least one sensor being adapted to generate an output signal corresponding to vibration of the flow tube thereat; and (e) applying the output signal to a computational means to determine the mass flow rate.

23. The method as set forth in claim 22, further comprising the steps of:
   (f) selectively removing and reapplying the alternating current to the strain element during oscillation, wherein while the alternating current is removed, the transducer will serve as a second sensor adapted to generate an other output signal corresponding to vibration of the flow tube thereat; and
   (g) utilizing the second output signal to control the alternating current.

24. The method as set forth in claim 22, wherein the at least one sensor comprises an other transducer having an elongated strain element.

25. The method as set forth in claim 22, wherein the transducer comprises a piezoelectric transducer.

26. The method as set forth in claim 22, wherein the transducer further comprises a magnetostrictive transducer.

27. The method as set forth in claim 22, further comprising the steps of:
   (h) disposing a plurality of sensors in spaced relation along the flow tube for generating a plurality of output signals;
   (i) applying the plurality of output signals to the computational means; and
   (j) comparing the plurality of output signals to one another for determination of the mass flow rate.

28. The method as set forth in claim 27, wherein the plurality of sensors are each adapted to generate an output signal corresponding to vibration of the flow tube thereat, wherein the output signals are compared to one another to measure difference in phase of vibration of the flow tube for determination of the mass flow rate.

29. The method as set forth in claim 27, wherein the plurality of sensors are each adapted to generate an output signal corresponding to torque generated in the flow tube thereat, wherein the output signals are compared to one another to measure difference in torque of the flow tube for determination of the mass flow rate.

* * * * *